United States Patent
Matsui et al.

(10) Patent No.: US 7,170,643 B2
(45) Date of Patent: Jan. 30, 2007

(54) IMAGE READING APPARATUS, COMPOSITE APPARATUS USING THE IMAGE READING APPARATUS, AND CONTROL APPARATUS AND METHOD FOR THE IMAGE READING APPARATUS

(75) Inventors: Noriaki Matsui, Ibaraki (JP); Nobuo Matsuoka, Kanagawa (JP); Toshio Hayashi, Ibaraki (JP); Junichi Kishimoto, Chiba (JP); Katsuhiro Ishido, Ibaraki (JP); Satoru Kijima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 09/769,917

(22) Filed: Jan. 25, 2001

(65) Prior Publication Data

US 2001/0022672 A1    Sep. 20, 2001

(30) Foreign Application Priority Data

Jan. 28, 2000    (JP)    .............................. 2000-019953

(51) Int. Cl.
G06K 15/00 (2006.01)
G06T 5/00 (2006.01)
H04N 1/407 (2006.01)
H04N 1/409 (2006.01)
H04N 1/46 (2006.01)

(52) U.S. Cl. .................... 358/3.26; 358/504; 358/521; 358/461

(58) Field of Classification Search .................. 358/1.9, 358/1.12, 461, 468, 475, 509, 464, 906, 3.26, 358/504, 521
See application file for complete search history.

(56) References Cited

U.S. PATENT DOCUMENTS

| 4,680,644 | A | * | 7/1987  | Shirato et al. ............... 358/474 |
| 4,797,943 | A | * | 1/1989  | Murayama et al. ......... 382/274 |
| 5,278,674 | A | * | 1/1994  | Webb et al. ................. 358/475 |
| 5,336,976 | A | * | 8/1994  | Webb et al. ................. 315/134 |
| 5,371,613 | A | * | 12/1994 | Arimoto et al. ............. 358/461 |
| 5,513,018 | A | * | 4/1996  | Nisimura .................... 358/474 |
| 5,802,217 | A | * | 9/1998  | Suzuki et al. ............... 382/274 |
| 5,864,408 | A | * | 1/1999  | Kumashiro .................. 358/461 |
| 5,980,010 | A | * | 11/1999 | Stephenson .................... 347/2 |
| 5,995,243 | A | * | 11/1999 | Kerschner et al. .......... 358/461 |
| 6,023,532 | A | * | 2/2000  | Kanesaka et al. ........... 382/274 |

FOREIGN PATENT DOCUMENTS

| JP | 05-014712   | 1/1993 |
| JP | A 8-009116  | 1/1996 |
| JP | 11-155048   | 6/1999 |
| JP | A 11-196266 | 7/1999 |
| JP | A 11-239244 | 8/1999 |

\* cited by examiner

*Primary Examiner*—David Moore
*Assistant Examiner*—James A. Thompson
(74) *Attorney, Agent, or Firm*—Morgan & Finnegan, L.L.P.

(57) ABSTRACT

In an image reading apparatus having a light source for illuminating a document, an image sensing element for outputting an electrical signal in accordance with an input light quantity, a first reference member, and a second reference member, shading correction data is acquired. A time since the light source is turned on is measured, and when the measured time does not reach a predetermined time, shading correction data is acquired by a first method using the first reference member. When the predetermined time has elapsed, shading correction data is acquired by a second method using the second reference member.

18 Claims, 12 Drawing Sheets

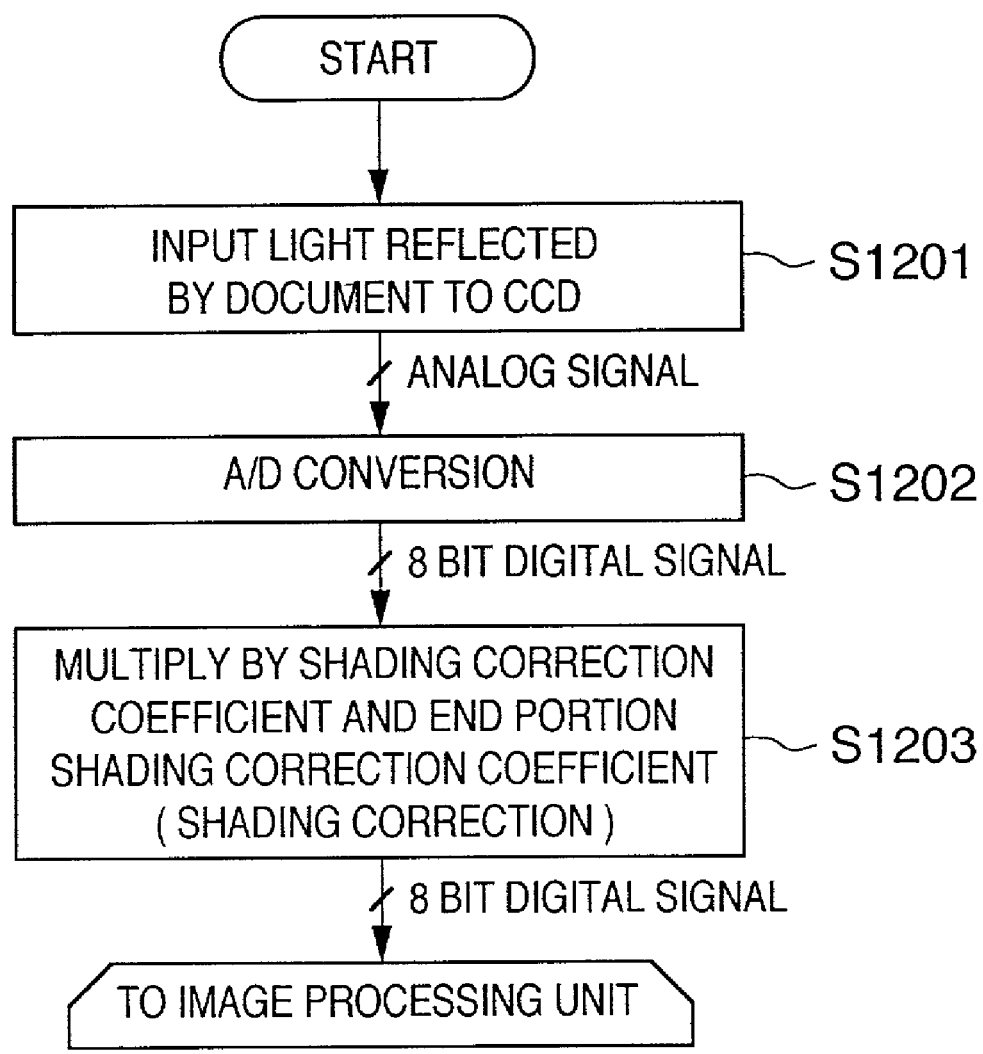

US 7,170,643 B2

IMAGE READING APPARATUS, COMPOSITE APPARATUS USING THE IMAGE READING APPARATUS, AND CONTROL APPARATUS AND METHOD FOR THE IMAGE READING APPARATUS

FIELD OF THE INVENTION

The present invention relates to an image reading apparatus, a hybrid apparatus using the image reading apparatus, a control method for the image reading apparatus and, more particularly, to an image reading apparatus for efficiently performing shading correction, a hybrid apparatus using the image reading apparatus, and a control apparatus and method for the image reading apparatus.

BACKGROUND OF THE INVENTION

Conventionally, a scanner unit as a document reading apparatus employs a halogen lamp, fluorescent lamp, or the like as a document illumination device. Recently, a xenon lamp is being used as a new illumination device. The xenon lamp, however, decreases in light quantity with the lapse of the time after the lamp is turned on. In addition, a means for adjusting the xenon lamp has not been developed yet. If document sheets are successively read, the image reading level varies.

In the use of the xenon lamp, therefore, this problem is solved by generating shading correction data at the start of image reading processing when, e.g., the start key of the scanner unit is pressed, and updating the shading correction data every predetermined time or every time a predetermined number of document sheets are read.

In addition, as disclosed in Japanese Patent Laid-Open No. 5-14712, a side white reference tape is pasted to a scan unit, and shading correction is done based on white reference information obtained by reading the side white reference tape. As disclosed in Japanese Patent Laid-Open No. 11-155048, the optical characteristics of a contact glass are arbitrarily controlled.

However, updating shading correction data during image reading decreases the image reading performance. Further, when the side white reference tape is pasted to the scan unit, proper correction cannot be achieved unless a decrease in the light quantity of the lamp is equal between the pasting position of the side white reference tape and the entire image reading area.

SUMMARY OF THE INVENTION

The present invention has been made in consideration of the above situation, and has as its object to provide an image reading apparatus capable of performing optimal shading correction without decreasing the performance, a hybrid apparatus using the image reading apparatus, and a control apparatus and method for the image reading apparatus.

According to the present invention, the foregoing object is attained by providing an image reading apparatus comprising a light source for illuminating a document an image sensing element for outputting an electrical signal in accordance with an input light quantity a first reference member a second reference member a timer for measuring a time since the light source is turned on and control means for determining whether the time measured by the timer reaches a predetermined time, in a case that the predetermined time has not elapsed, acquiring shading correction data by a first method using the first reference member, and in a case that the predetermined time has elapsed, acquiring shading correction data by a second method using the second reference member.

According to the present invention, the foregoing object is also attained by providing a control apparatus for an image reading unit having a light source for illuminating a document, an image sensing element for outputting an electrical signal in accordance with an input light quantity, a first reference member, and a second reference member, comprising a timer for measuring a time since the light source is turned on; and control means for determining whether the time measured by the timer reaches a predetermined time, in a case that the predetermined time has not elapsed, acquiring shading correction data by a first method using the first reference member, and in a case that the predetermined time has elapsed, acquiring shading correction data by a second method using the second reference member.

Further, according to the present invention, the foregoing object is also attained by providing a hybrid apparatus comprising a light source for illuminating a document an image sensing element for outputting an electrical signal in accordance with an input light quantity a first reference member a second reference member a timer for measuring a time since the light source is turned on control means for determining whether the time measured by the timer reaches a predetermined time, in a case that the predetermined time has not elapsed, acquiring shading correction data by a first method using the first reference member, and in a case that the predetermined time has elapsed, acquiring shading correction data by a second method using the second reference member correction means for correcting the electrical signal output from the image sensing element, and outputting an image signal and print means for printing an image of the document on a print medium on the basis of the image signal corrected by the correction means, wherein the correction means performs shading correction using at least the shading correction data.

Furthermore, according to the present invention, the foregoing object is also attained by providing a facsimile apparatus comprising a light source for illuminating a document an image sensing element for outputting an electrical signal in accordance with an input light quantity a first reference member a second reference member a timer for measuring a time since the light source is turned on control means for determining whether the time measured by the timer reaches a predetermined time, in a case that the predetermined time has not elapsed, acquiring shading correction data by a first method using the first reference member, and in a case that the predetermined time has elapsed, acquiring shading correction data by a second method using the second reference member correction means for correcting the electrical signal output from the image sensing element, and outputting an image signal output means for outputting the electrical signal corrected by the correction means to an external device via a communication line input means for inputting an image signal from the external device via the communication line and print means for printing an image on a print medium on the basis of the image signal input via the input means, wherein the correction means performs shading correction using at least the shading correction data.

Further, according to the present invention, the foregoing object is also attained by providing a control method for an image reading unit having a light source for illuminating a document, an image sensing element for outputting an electrical signal in accordance with an input light quantity, a first reference member, and a second reference member, comprising a measurement step of measuring a time since the light source is turned on a determination step of determining whether the time measured in the measurement step reaches a predetermined time a first acquisition step of acquiring shading correction data using the first reference member in a case that the predetermined time has not elapsed and a second acquisition step of acquiring shading correction data using the second reference member in a case that the predetermined time has elapsed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 12 is a flow chart showing the flow of document reading data according to the embodiment of the present invention.

DETAILED DESCRIPTION OF THE PREFERRED EMBODIMENT

A preferred embodiment of the present invention will be described in detail in accordance with the accompanying drawings.

Figure 1:
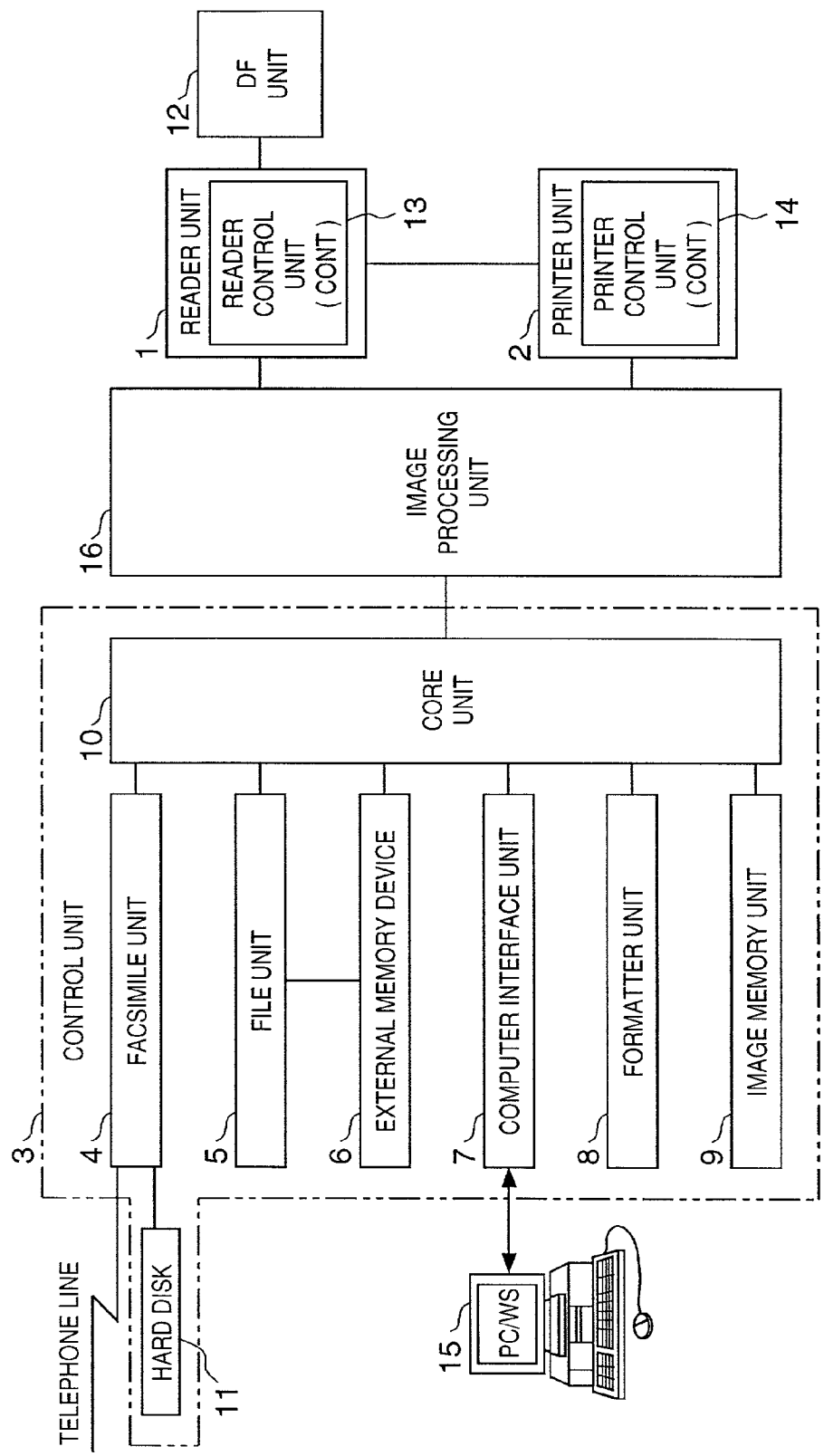
FIG. 1 is a block diagram showing the configuration of an image forming system according to an embodiment of the present invention.

FIG. 1 is a block diagram showing the configuration of an image forming system according to the embodiment of the present invention.

In FIG. 1, reference numeral 1 denotes a reader unit for reading a document and converting the document data into image data; 2, a printer unit which has a plurality of kinds of print sheet cassettes, and outputs image data as a visual image on a print sheet in accordance with a print instruction; and 3, a control unit which is electrically connected to the reader unit 1, and has various functions.

The control unit 3 comprises a facsimile unit 4 connected to a telephone line and a hard disk 11, a file unit 5, an external memory device 6 connected to the file unit 5, a computer interface unit 7 for connecting a computer/workstation 15 (to be referred to as a "PS/WS" hereinafter) or a LAN (not shown), a formatter unit 8 for visualizing information input via the computer I/F 7, an image memory unit 9 for storing information from the reader unit 1 or temporarily storing information input via the computer I/F 7, and a core unit 10 for controlling these functions.

The reader unit 1 comprises a reader control unit 13 (to be referred to as the "CONT 13" hereinafter) for controlling the reader unit 1. The reader unit 1 is electrically connected to a document feeder (to be referred to as a "DF" hereinafter) unit 12 for controlling a DF. The printer unit 2 comprises a printer control unit 14 (to be referred to as the "CONT 14" hereinafter) for controlling the printer unit 2. An image processing unit 16 performs image processing set by various operation units on image data input from the control unit 3 and reader unit 1. Note that the image processing unit 16 has a selector (not shown) for switching between the printer unit 2 and an external device 3 to output image data input from the reader unit 1, or selecting either one of a signal from the reader unit 1 and image data from the external device 3 and outputting the selected one to the printer unit 2.

Figure 2:
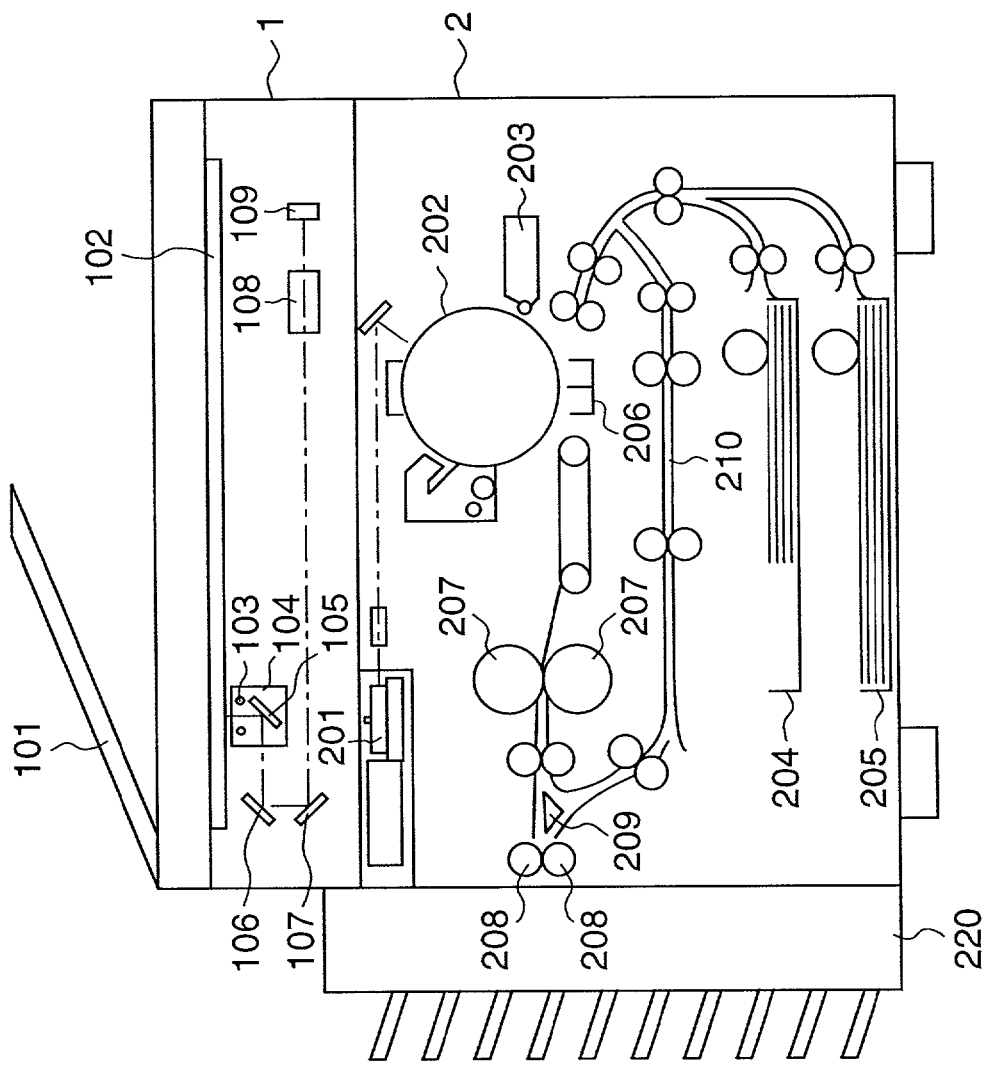
FIG. 2 is a sectional view showing the arrangements of a reader unit and printer unit shown in FIG. 1.

FIG. 2 is a sectional view showing an arrangement when the reader unit 1, printer unit 2, and image processing unit 16 shown in FIG. 1 are integrated. Note that the image processing unit 16 is generally a thin circuit board, and is not illustrated in FIG. 2. The arrangements and operations of these units will be explained.

Document sheets set on a DF 101 are sequentially conveyed one by one to a platen glass 102 of a document table. When the document sheet is conveyed to a predetermined position on the platen glass 102, a lamp 103 of the reader unit 1 using a xenon tube is turned on, and a scanner unit 104 moves to illuminate the document.

Light reflected by the document incidents on a CCD image sensor 109 (to be referred to as a "CCD" hereinafter) via mirrors 105, 106, and 107 and a lens 108. The light which is reflected by the document to irradiate the CCD 109 is photoelectrically converted by the CCD 109. The converted electrical signal (image data) is sent to the image processing unit 16, which performs image processing set by various operation units.

The electrical signal supplied to the printer unit 2 by the selector of the image processing unit 16 undergoes image processing, and converted into an optical signal to irradiate a electrostatic drum 202. A latent image formed on the electrostatic drum 202 by the irradiation light is developed by a developing unit 203.

A print sheet is conveyed from a print sheet stack unit 204 or 205 in synchronism with the leading end of the developed image, and the developed image is transferred onto the print sheet by a transfer unit 206. The transferred image is fixed to the print sheet by fixing rollers 207, and discharged outside the apparatus via discharge rollers 208. The print sheet output from the discharge rollers 208 is sorted by a sorter 220.

A method of outputting sequentially read images on two surfaces of one print sheet will be explained. After a print sheet having an image fixed by the fixing rollers 207 is temporarily conveyed to the discharge rollers 208, the conveyance direction of the sheet is reversed, and the print sheet is conveyed to a refeed printed-sheet stack unit 210 via a conveyance direction selection member 209. When the next document sheet is set, the document image is read by the same process. A print sheet is fed from the refeed printed-sheet stack unit 210, thereby printing document images on the upper and lower surfaces of a single print sheet.

Figure 3:
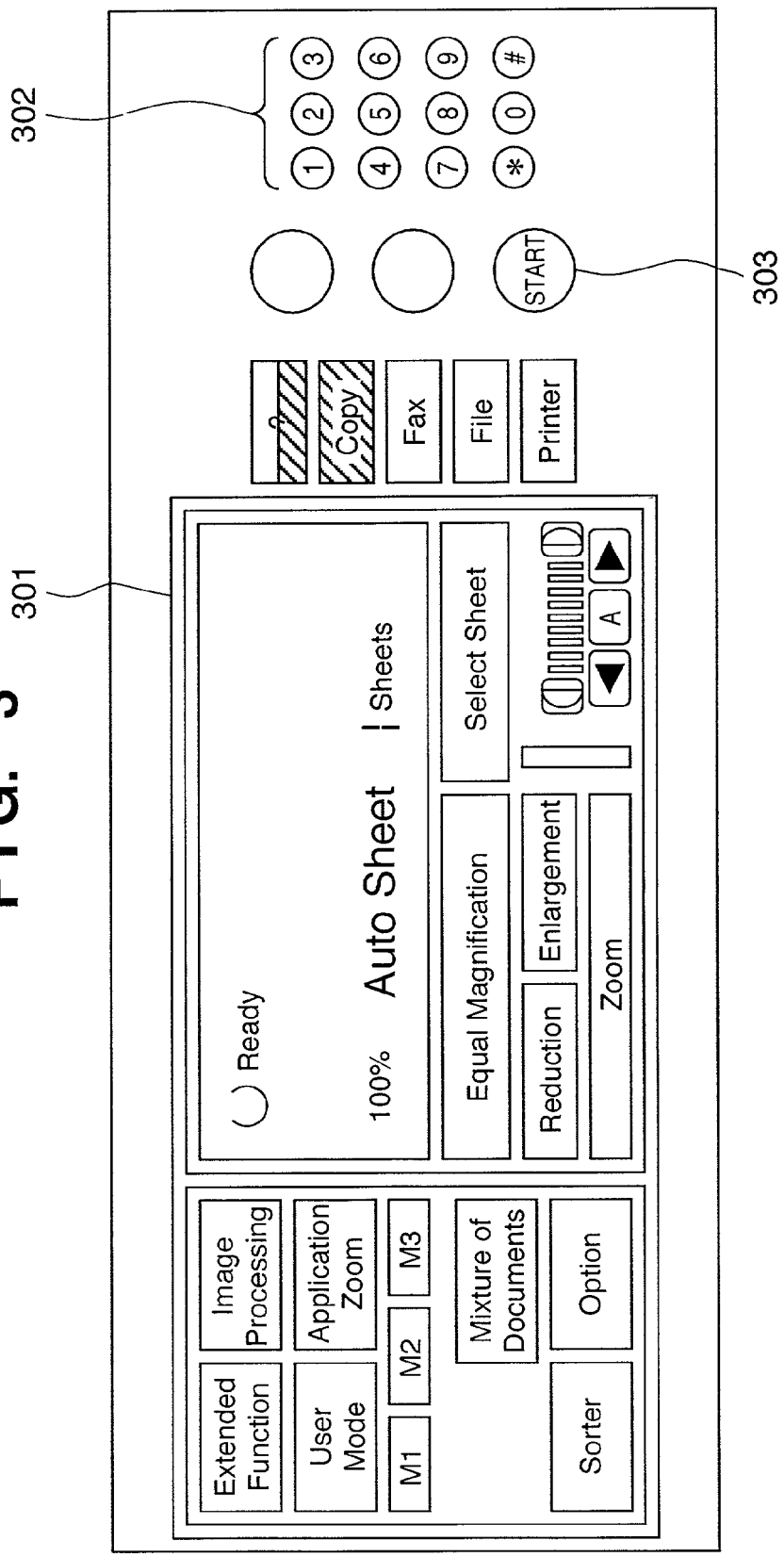
FIG. 3 is a plan view showing an example of an operation panel arranged on the reader unit shown in FIG. 1.

FIG. 3 is a plan view showing an example of an operation panel arranged on the reader unit 1 shown in FIG. 2. In FIG. 3, reference numeral 301 denotes a display unit for displaying an operation status and message. The surface of the display unit 301 is a touch panel, and functions as a selection key by touching the surface. The magnification and the like are set on this touch panel. Reference numeral 302 denotes a ten-key pad for inputting figures. The number of copies of one document sheet is set on the ten-key pad 302. Reference numeral 303 denotes a start key. When this key is pressed, the operation starts.

Figure 4:
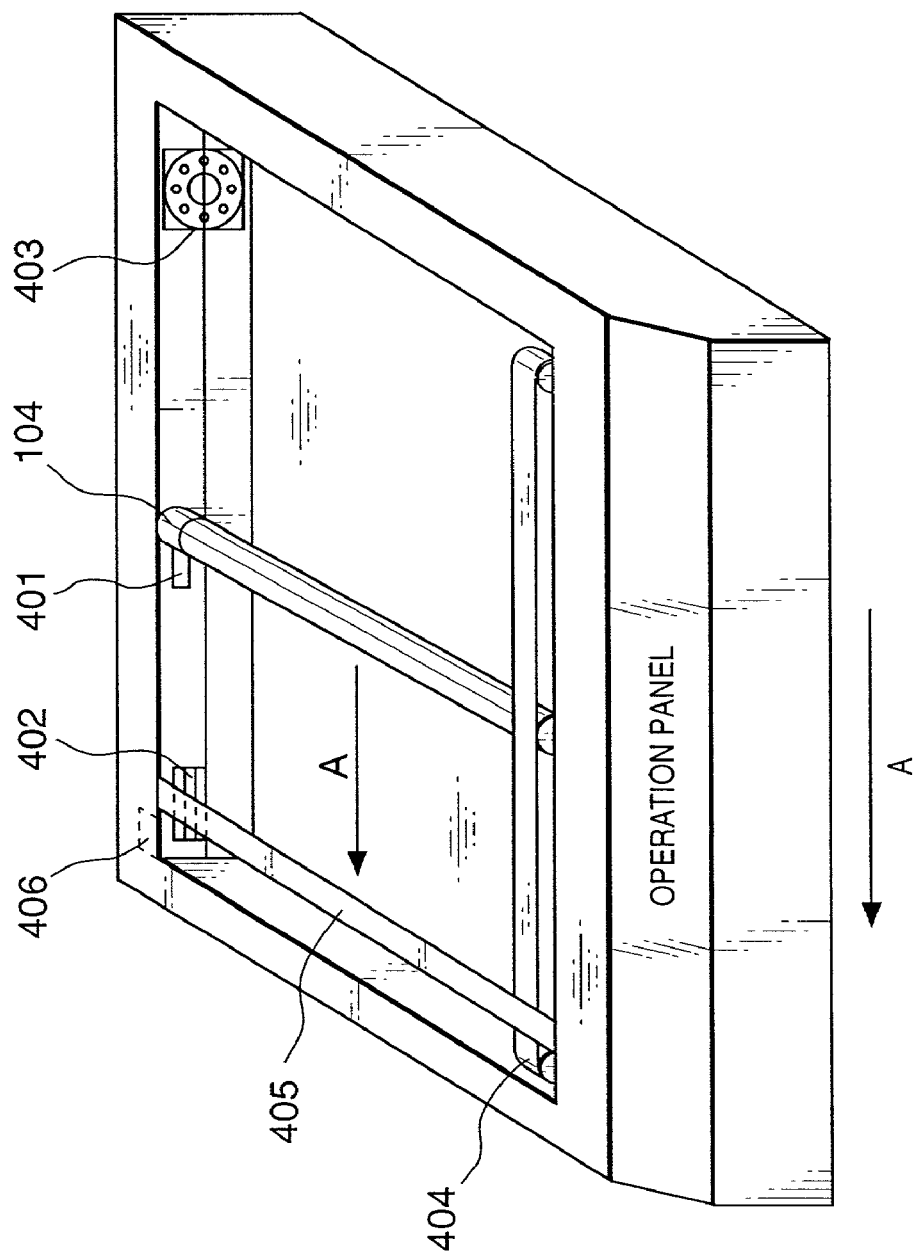
FIG. 4 is a perspective view showing an example of the reader unit except for a document feeder shown in FIG. 1.

FIG. 4 is a perspective view showing an example of the reader unit 1 except for the DF 101 shown in FIG. 2. In FIG. 4, reference numeral 401 denotes a light-shielding plate which shields a home position (HP) sensor 402, and HP search processing (to be described later) for confirming the HP is performed using an output (ON or OFF) from the HP sensor 402 (see FIG. 6). The scanner unit 104 is moved forward and backward by an optical motor 403 (pulse motor) and conveyance belt 404. Note that the direction indicated by arrow A in FIG. 4 is the backward direction, and the opposite direction is the forward direction. Reference numeral 405 denotes a white plate which is used for general shading correction data acquisition processing (to be described later), and located at a position on the lower side (scanner unit 104 side) of the platen table where data can be read when the scanner unit 104 is at the HP; and 406, an end portion white plate used for end portion shading correction data acquisition processing (to be described later).

Figure 5:
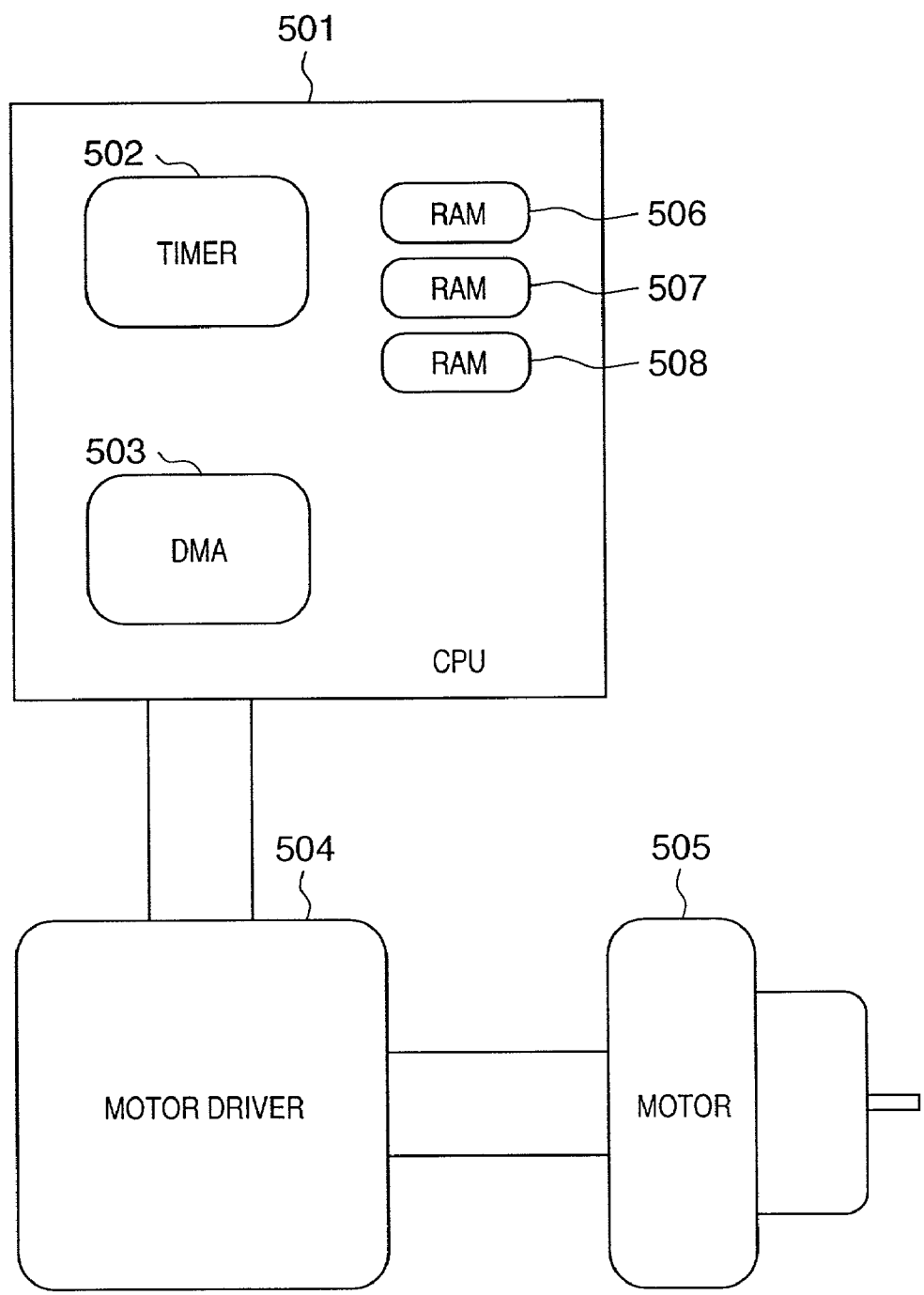
FIG. 5 is a block diagram showing the arrangement of a scanner unit according to the embodiment of the present invention.

Actual image reading operation of the scanner unit 104 will be described with reference to FIG. 5. A CPU 501 as the main part of the CONT 13 in FIG. 1 comprises RAMs 506 and 507 for storing a pixel at which the lamp light quantity (to be described later) maximizes, and its peripheral pixels, and a RAM 508 for storing the time. The CPU 501 uses an internal timer 502 and DMA (Direct Memory Access) 503 to control a drive pulse. The generated drive pulse drives an optical motor 505 via a motor driver 504. The scanner unit 104 moves forward and backward by switching a hard port (not shown) by software.

The above-mentioned HP search processing will be described with reference to the flow chart of FIG. 6. Whether an output from the HP sensor 402 in FIG. 4 is ON is checked (step S601). Note that the output is ON while the light-shielding plate 401 in FIG. 4 shields the HP sensor 402. If YES in step S601, the scanner unit 104 is moved forward until the output from the HP sensor 402 changes to OFF (step S602). Since the distance from the position where the output from the HP sensor 402 changes to OFF to the HP is fixed, a corresponding specified moving amount is counted by the DMA 503, the scanner unit 104 is moved backward by the count amount (step S603), and the processing ends. If NO in step S601, the processing advances to step S604, and the scanner unit 104 moves until the output from the HP sensor 402 changes from OFF to ON. Since the distance from the position where the output from the HP sensor 402 changes from ON to OFF to the HP is the same as that when the output changes from OFF to ON, the above operation is executed in step S603, and the processing ends.

Figure 7:
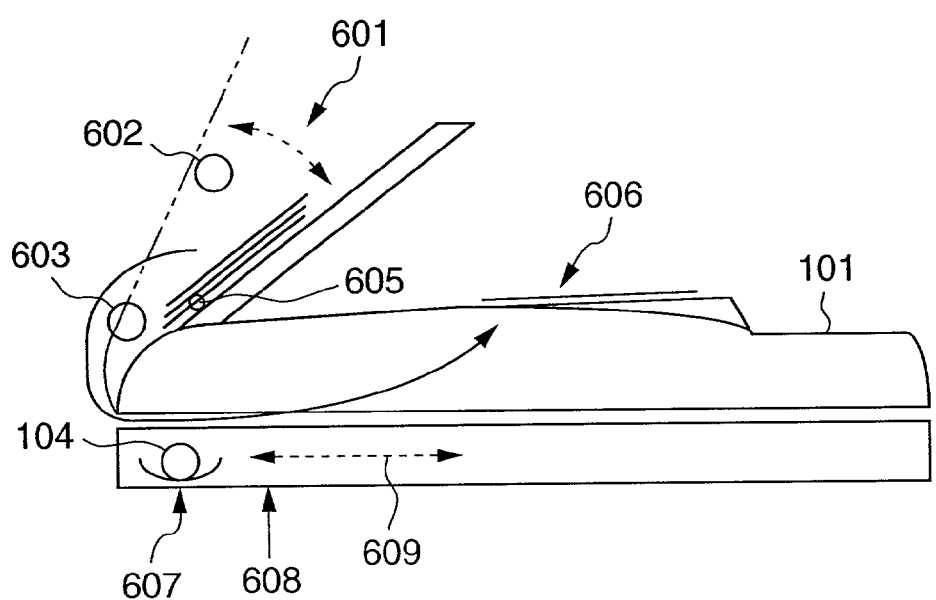
FIG. 7 is a sectional view showing the structure of the document feeder shown in FIG. 1.

Reading a document using the DF 101 will be described with reference to FIG. 7.

Whether document sheets are set in a document feed port 601 of the DF 101 is detected by a sensor 605. When the start key 303 on the operation panel shown in FIG. 3 is pressed, the document sheets are fed from the top document sheet set in the document feed port 601. Feed operation is performed by moving a pickup roller 602 down to the document surface and rotating the pickup roller 602. Then, a registration roller 603 establishes the document scan timing.

The scanner unit 104 turns the lamp on at an image read position 607, and reads a document sheet. Read document sheets are sequentially discharged to a document discharge port 606. When shading correction data (to be described later) is to be acquired between ON operation of the lamp and scan of the document sheet, the scanner unit 104 moves from the image read position 607 to a HP position 608. After the shading correction data is acquired, the scanner unit 104 moves again to the image read position 607. This can shorten the document reading time.

When end portion shading correction data (to be described later) is to be acquired after ON operation of the lamp, the scanner unit 104 does not move, but reads the end portion white plate attached to an end portion in the main scanning direction at the image read position 607, and digitally increases the gain uniformly in the entire document read area of the scanner unit 104.

The operation of the reader unit 1 in this embodiment will be explained with reference to the flow charts of FIGS. 4 and 8. Control in FIG. 8 may be executed by either the reader control unit 13 or the image processing unit 16. Whether document sheets are set in the document feed port 601 on the DF 101 is determined (step S801). This determination is repeated until document sheets are set. If YES in step S801, HP search processing in FIG. 6 is performed (step S802).

Whether the start key 303 on the operation unit is pressed is checked (step S803). If YES in step S803, one top document sheet in the document feed port 601 is pre-fed (step S804). In pre-feed operation, one top document sheet is fed to the registration roller 603. At the same time, the lamp is turned on, and the white plate 405 set at a position corresponding to the HP on the lower side of the document table, as shown in FIG. 4, is read to acquire shading correction data (step S805).

Shading correction data acquisition processing will be explained with reference to the flow chart of FIG. 9.

Shading correction data acquisition processing is executed at the HP position 608 where the white plate 405 is read by the CCD 109 (step S901). After the end of reading, shading correction data calculated by a known method based on the read data is stored (step S902). A shading correction coefficient as a fixed value representing the ratio of the white plate 405 and white data of a document to be read is written in a hard register (not shown) (step S903). Then, the processing ends. Note that the shading correction coefficient is also shading correction data in a broad sense. In this case, however, the shading correction coefficient is discriminated from shading correction data for correcting nonuniformity of the light quantity of the lamp 103 between respective pixel positions in the main scanning direction with reference to the white plate 405.

Figure 8:
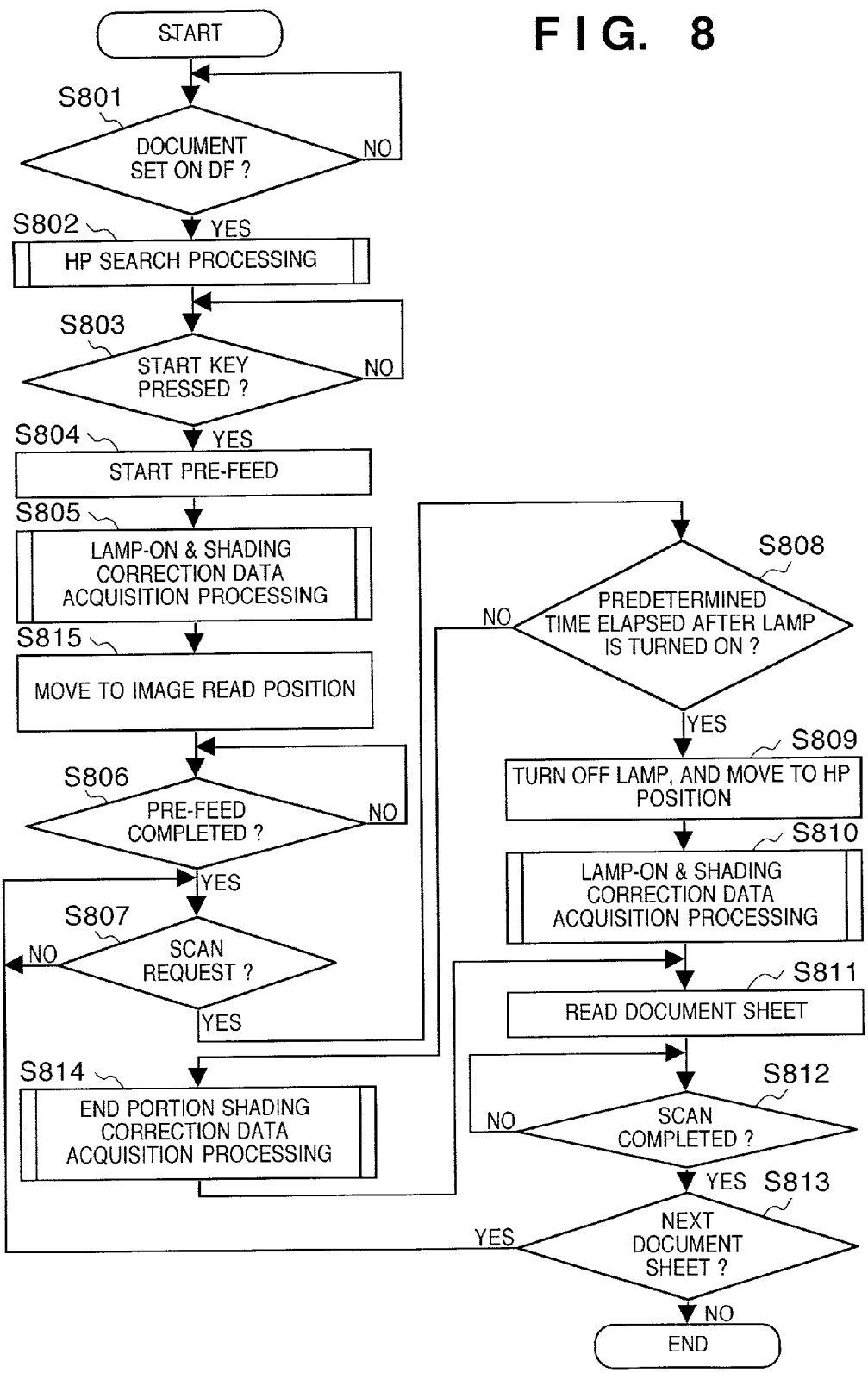
FIG. 8 is a flow chart showing the operation of the reader unit according to the embodiment of the present invention.

The processing returns to FIG. 8 to move the scanner unit 104 to the image read position 607 (step S815).

Whether pre-feed operation in step S804 is completed is checked (step S806). If YES in step S806, whether print sheets have been prepared in the printer unit 2 is confirmed. In this embodiment, when print sheets have been prepared in the printer unit 2, the printer unit 2 sends a scan request to the reader unit 1. Hence, whether a scan request is output is checked (step S807).

If YES in step S807, whether a predetermined time has elapsed after the lamp is turned on is determined (step S808). The predetermined time is determined by predetermined time setting processing (to be described later).

Figure 10:
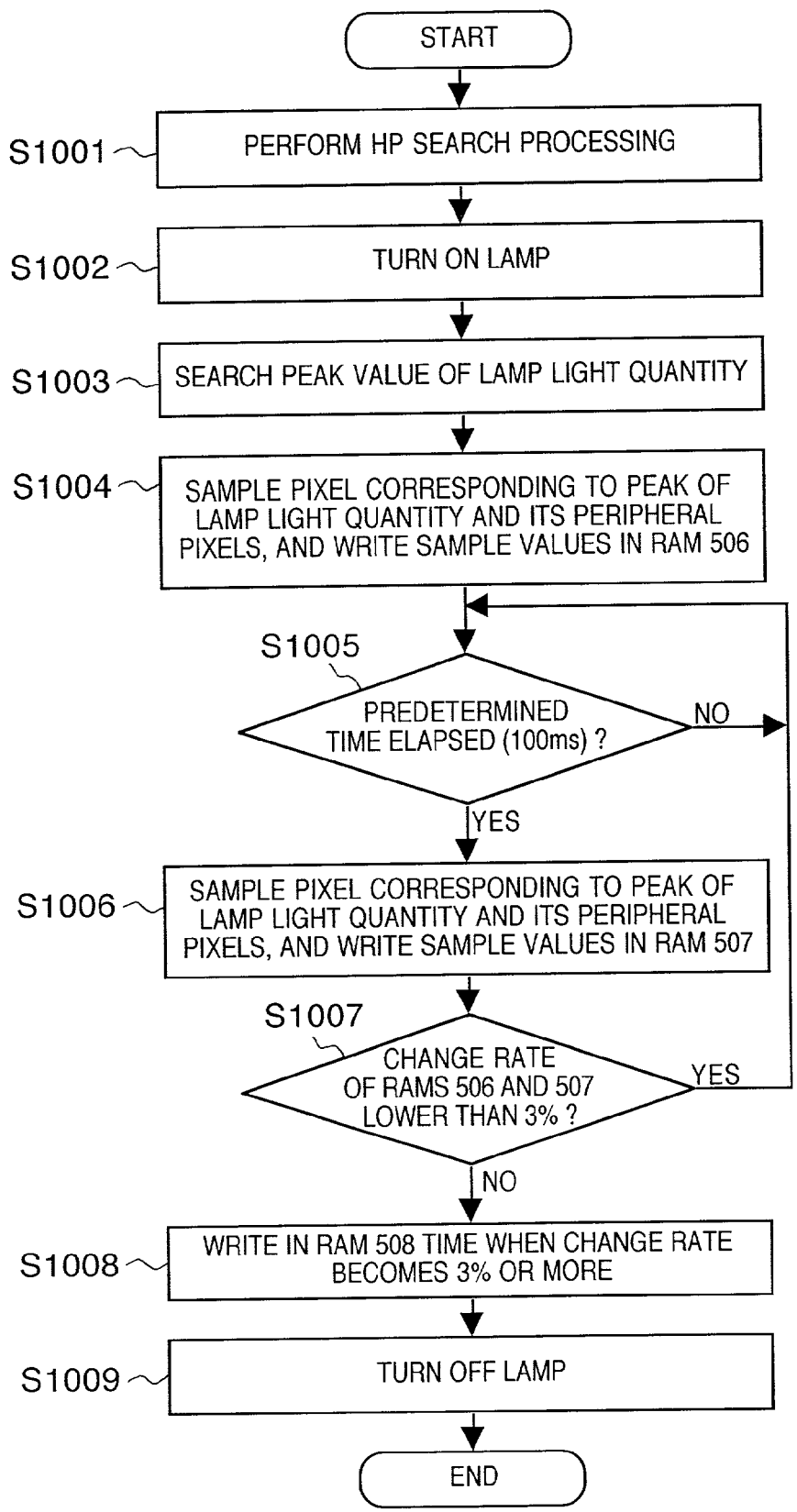
FIG. 10 is a flow chart showing predetermined time setting processing according to the embodiment of the present invention.

Predetermined time setting processing will be described with reference to the flow chart of FIG. 10. Predetermined time setting processing is executed in shipment of the image forming system and in maintenance of the image forming system by a serviceman.

Figure 6:
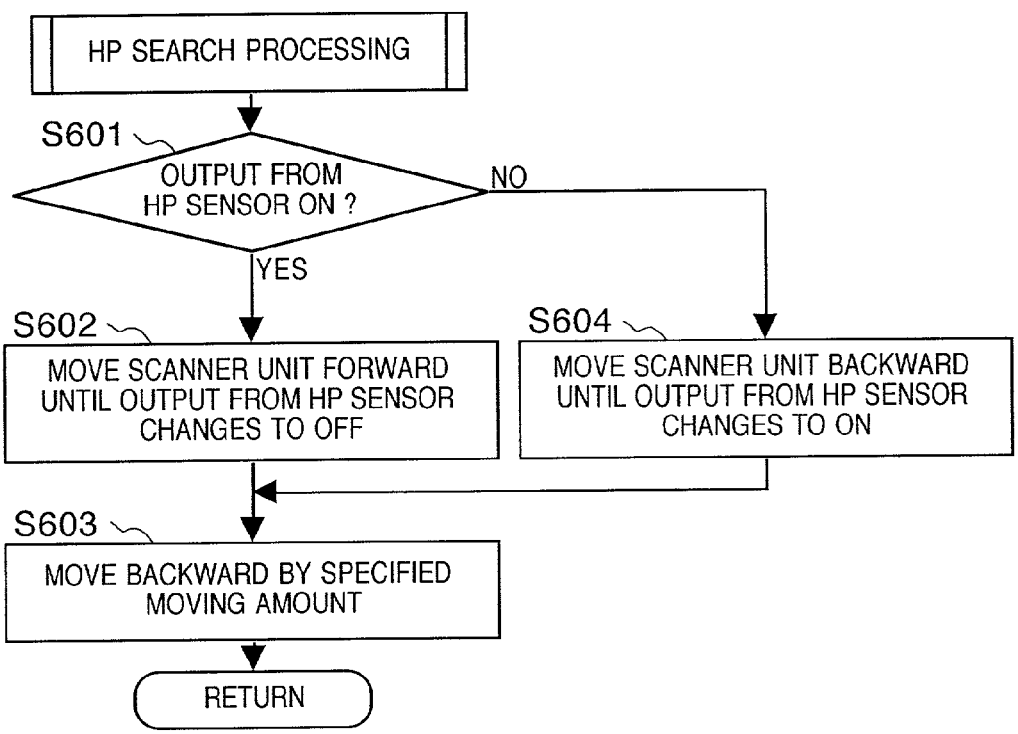
FIG. 6 is a flow chart showing HP search processing according to the embodiment of the present invention.

In predetermined time setting processing, HP search processing in FIG. 6 is performed to move the scanner unit 104 to the HP position 608 (step S1001). After HP search processing ends, the lamp 103 is turned on (step S1002), the CCD 109 reads the white plate present at the HP position 608, and the peak position of the lamp light quantity in the main scanning direction is searched (step S1003). This is because predetermined time setting processing based on the peak position of the lamp light quantity can realize more accurate adjustment. If the peak position of the lamp light quantity is found, a pixel corresponding to the peak of the lamp light quantity and its peripheral pixels are sampled, and the sampled values are written in the RAM 506 (step S1004).

Whether a predetermined time (e.g., 100 ms) has elapsed is checked (step S1005). If NO in step S1005, this determination is repeated; and if YES, the CCD 109 reads the white plate present at the HP position 608, a pixel corresponding to the peak of the lamp light quantity and its peripheral pixels are sampled, and the sampled values are written in the RAM 507 (step S1006).

The change rate of the values written in the RAMs 506 and 507 is calculated, and whether the change rate is lower than 3% is checked (step S1007). If YES in step S1007, the processing returns to step S1005; and if NO, the time at which the change rate becomes 3% or more is written in the RAM 508 (step S1008). Then, the lamp 103 is turned off (step S1009), and the processing ends. Note that when the lamp is turned on in step S1002, the timer 502 starts and measures a lapse time until the change rate becomes 3% or more. The time written in the RAM 508 in this manner is used for the above-described determination in step S808. Thus, the timing at which the light quantity decreases can be accurately grasped, and a document can be read at an optimal light quantity level.

The reference of the change rate is not limited to 3%, and the value of the change rate can be freely changed.

The processing returns to FIG. 8. If the predetermined time is determined in step S808 to have elapsed after the lamp 103 is turned on, the lamp 103 is turned off, and the scanner unit 104 is moved to the HP position 608 (step S809).

Figure 9:
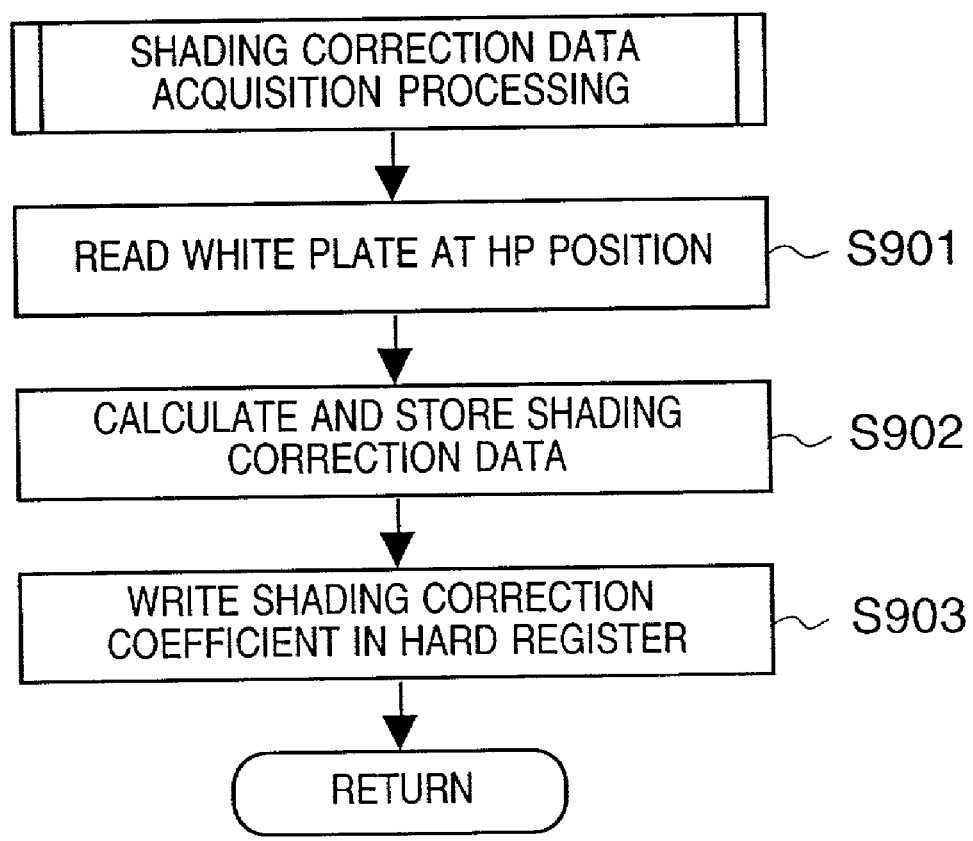
FIG. 9 is a flow chart showing shading correction processing according to the embodiment of the present invention.

The lamp is turned on again, the white plate 405 at the HP position 608 is read, and shading correction data acquisition processing in FIG. 9 is executed (step S810). The scanner unit 104 is moved to the image read position 607 (step S820). Shading correction data acquisition processing is executed again because the predetermined time has elapsed after the lamp 103 is turned on, and the light quantity of the lamp 103 decreases. Not end portion shading correction data acquisition processing but normal shading correction data acquisition processing is performed because end portion shading correction data acquisition processing is only to read the end portion white plate 406 and digitally increase the gain uniformly in the entire document sheet reading area of the scanner unit 104, and is not suitable for correcting a decrease in light quantity upon the lapse of the predetermined time. In other words, a decrease in light quantity upon the lapse of the predetermined time is not uniform in the entire area, so end portion shading correction data acquisition processing is not suitable for setting a proper light quantity level when the predetermined time has elapsed.

Thereafter, a feed request is output to the DF 101 to start feeding the document sheet on standby at the registration roller 603, and the document sheet is read (step S811). In step S811, the next document sheet is simultaneously pre-fed from the document feed port 601.

After step S811, whether the document sheet has been scanned is checked (step S812). If YES in step S812, whether the next document sheet to be read exists is determined (step S813). If YES in step S813, the processing returns to step S807; and if NO, the processing ends.

Note that if the predetermined time is determined in step S808 not to have elapsed after the lamp 103 is turned on, end portion shading correction data acquisition processing is performed to cope with a slight decrease in the light quantity of the lamp 103 (end portion shading correction data acquisition processing will be described later) (step S814). Then, the processing shifts to step S811. Normal shading correction data acquisition processing in step S810 is not performed, end portion shading correction data acquisition processing is done because normal shading correction data acquisition processing is accompanied by an operation of moving the scanner unit 104 from the image read position 607 to the HP position 608, reading the white plate 405 at the HP 608, and calculating shading correction data, and the document read performance decreases. In addition, since the predetermined time has not elapsed yet after the lamp 103 is turned on, a decrease in light quantity is usually small and hardly influences document reading data.

End portion shading correction data acquisition processing will be explained with reference to the flow chart of FIG. 11.

Whether a read document sheet immediately after ON operation of the lamp 103 is the first document sheet is determined (step S1101). If YES in step S1101, shading correction processing has immediately been performed, and the processing in FIG. 11 ends without executing any processing.

If the read document is the second or subsequent document sheet (NO in step S1101), the CCD 109 reads the end portion white plate 406 set at the end portion in the main scanning direction, and end portion data is generated (step S1102). At this time, if the document sheet is the second one, end portion correction reference data is also generated.

The end portion data is compared with the end portion correction reference data to obtain an end portion shading correction coefficient (step S1103). This end portion shading correction coefficient is written in the hard register (not shown in FIG. 2) (step S1104), and the processing ends.

The flow of document read data will be described with reference to the flow chart of FIG. 12. As described above, light reflected by a document irradiated by the lamp 103 incidents on the CCD 109 (step S1201). Charges (analog output) accumulated in accordance with the light quantity of the reflected light are output to an A/D converter (not shown). The A/D converter converts the accumulated charges into, e.g., 8-bit digital data (step S1202). The 8-bit digital data converted in step S1002 is multiplied by shading correction data and a shading correction coefficient for correcting light source nonuniformity of the lamp 103, the difference in the transmitted light quantity of a condenser lens between central and end portions, variations in the sensitivities of reflective elements in the CCD 109, and the like (shading correction) (step S1203).

The corrected 8-bit digital data is output to the image processing unit 16, and the processing ends. By this processing, the entire image area can be uniformly read to perform image processing.

As described above, according to this embodiment, when a predetermined time has not elapsed yet after the lamp 103 is turned on, a decrease in light quantity is usually small and hardly influences document read data, and thus end portion shading correction data acquisition processing is done. When the predetermined time has elapsed, normal shading correction data acquisition processing is done to calculate again a shading correction coefficient and optimize the light quantity level. Accordingly, optimal shading correction data acquisition processing can be executed without decreasing the performance.

In the above embodiment, the lamp 103 uses a xenon tube. However, the present invention is not limited to this, and can be applied to a case wherein various kinds of lamps are used.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Figure 11:
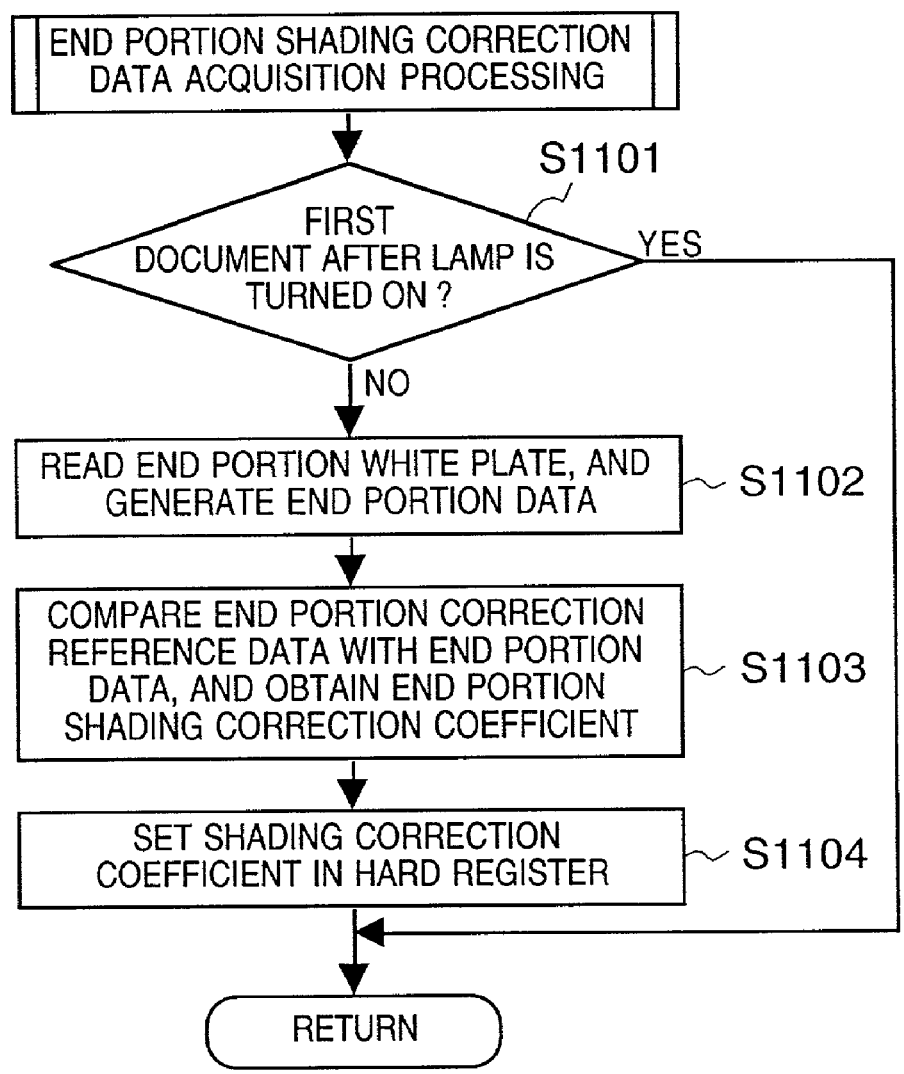
FIG. 11 is a flow chart showing end portion shading correction processing according to the embodiment of the present invention.

In a case where the present invention is applied to the aforesaid storage medium, the storage medium stores program codes corresponding to the flowcharts described in FIGS. 8, 9 and 11 at least in the embodiment.

The present invention is not limited to the above embodiments and various changes and modifications can be made within the spirit and scope of the present invention. Therefore to apprise the public of the scope of the present invention, the following claims are made.

What is claimed is:

1. An image reading apparatus, comprising:
a light source adapted to illuminate an original sheet;
an image sensor adapted to scan said original sheet and output electrical signals;
a feeder capable of successively supplying a plurality of original sheets to an original sheet scanning area of said image sensor;
a first reference member which is arranged in the original scanning area of said image sensor in a sub-scanning direction;
a second reference member which is arranged in an area other than the original sheet scanning area of said image sensor in the sub-scanning direction;
a memory adapted to store a predetermined time since said light source is turned on until a maximum of electrical signals output from said image sensor at the time said light source is turned on changes a predetermined rate;
a timer adapted to measure an on time since said light source is turned on; and
a controller adapted to determine whether the time measured by said timer reaches the predetermined time, in a case that the predetermined time has not elapsed, control said image sensor to scan said first reference member illuminated by said light source for acquiring a coefficient for uniformly changing level of the electrical signals while said image sensor scans the plurality of original sheets which are successively supplied by said feeder, and in a case that the predetermined time has elapsed, control said image sensor to interrupt the scanning operation of the plurality of original sheets and scan said second reference member illuminated by said light source only once for acquiring shading correction data in a main scanning direction, and then restart scanning of the remaining original sheets and scan said first reference member illuminated by said light source while said image sensor scans the remaining original sheets without scanning said second reference member.

2. The apparatus according to claim 1, further comprising:
a correction unit which uses the shading correction data to perform shading correction on the electrical signals output from said image sensor.

3. The apparatus according to claim 1, wherein said first and second reference members comprise white plates.

4. The apparatus according to claim 3, wherein said first reference member is arranged at an end portion of a main scanning direction.

5. The apparatus according to claim 1, wherein the determination by said controller is performed before each original sheet is read.

6. The apparatus according to claim 5,
wherein said controller performs the determination in a case that said feeder supplies each original sheet to a predetermined position.

7. The apparatus according to claim 1, wherein in a case that a first original sheet is to be read after said light source is turned on, said controller controls said image sensor to scan said second reference member illuminated by said light source for acquiring shading correction data in the main scanning direction before start of read of the original sheet.

8. The apparatus according to claim 7, wherein in a case that the first original sheet is to be read after said light source is turned on, and the predetermined time has not elapsed, said controller skips controlling said image sensor to scan said first reference member illuminated by said light source for acquiring the coefficient for uniformly changing level of the electrical signals.

9. A control method for an image reading unit having a light source adapted to illuminate an original sheet, an image sensor adapted to scan said original sheet and output electrical signals, a feeder capable of successively supplying a plurality of original sheets to an original sheet scanning area of said image sensor, a first reference member which is arranged in the original sheet scanning area of said image sensor in a sub-scanning direction, and a second reference member which is arranged in an area other than the original scanning area of said image sensor in the sub-scanning direction, comprising:

storing a predetermined time since said light source is turned on until a maximum of electrical signals output from said image sensor at the time said light source is turned on changes a predetermined rate;

measuring an on time since the light source is turned on;

determining whether the measured time reaches the predetermined time;

controlling said image sensor to scan the first reference member illuminated by said light source for acquiring a coefficient for uniformly changing level of the electrical signals while said image sensor scans the plurality of original sheets which are successively supplied by said feeder in a case that the predetermined time has not elapsed; and controlling said image sensor to interrupt the scanning operation of the plurality of original sheets, scan the second reference member illuminated by said light source only once for acquiring shading correction data in a main scanning direction in a case that the predetermined time has elapsed, then restart scanning of the remaining original sheets and scan said first reference member illuminated by said light source while said image sensor scans the remaining original sheets without scanning said second reference member.

10. The method according to claim 9, further comprising: performing shading correction on the electrical signals output from the image sensor.

11. The method according to claim 9, wherein the first and second reference members comprise white plates.

12. The method according to claim 11, wherein the first reference member is arranged at an end portion of a main scanning direction.

13. The method according to claim 9, wherein said determination is performed before each original sheet is read.

14. The method according to claim 13, wherein said determination is performed in a case that the feeder supplies each original sheet to a predetermined position.

15. The method according to claim 9, further comprising determining whether an original sheet is a first document sheet after the light source is turned on, wherein in a case that the original sheet is determined to be the first document sheet, said controlling of said image sensor to scan the second reference member illuminated by said light source is executed before start of read of the original sheet regardless of a result of determining whether the measured time reaches the predetermined time.

16. The method according to claim 15, wherein in a case that the original sheet is determined to be the first document sheet, said controlling of said image sensor to scan the first reference member illuminated by said light source for acquiring a coefficient for uniformly changing level of the electrical signals is skipped regardless of the result of determining whether the measured time reaches the predetermined time.

17. An image reading apparatus comprising:

a light source adapted to illuminate an original sheet;

an image sensor adapted to scan said original sheet and output electrical signals;

a feeder capable of successively supplying a plurality of original sheets to an original sheet scanning area of said image sensor;

a reference member which is arranged in an area other than the original sheet scanning area of said image sensor in a sub-scanning direction;

a memory adapted to store a predetermined time since said light source is turned on until a maximum of electrical signals output from said image sensor at the time said light source is turned on changes a predetermined rate;

a timer adapted to measure an on time since said light source is turned on; and a controller adapted to determine whether the time measured by said timer reaches the predetermined time and, in a case that the predetermined time has not elapsed, control said image sensor to scan the plurality of original sheets which are successively supplied by said feeder, and, in a case that the predetermined time has elapsed, control said image sensor to interrupt the scanning operation of the plurality of original sheets, scan said reference member illuminated by said light source only once for acquiring shading correction data in a main scanning direction and then restart scanning of the remaining original sheets without scanning said reference member.

18. A control method for an image reading unit having a light source adapted to illuminate an original sheet, an image sensor adapted to scan said original sheet and output electrical signals, a feeder capable of successively supplying a plurality of original sheets to an original sheet scanning area of said image sensor; a reference member which is arranged in an area other than the original sheet scanning area of said image sensor in a sub-scanning direction, comprising:

storing a predetermined time since said light source is turned on until a maximum of electrical signals output from said image sensor at the time said light source is turned on changes a predetermined rate;

measuring an on time since the light source is turned on;

determining whether the measured time reaches the predetermined time; and controlling said image sensor to scan the plurality of original sheets which are successively supplied by said feeder in a case that the predetermined time has not elapsed; and controlling said image sensor to interrupt the scanning operation of the plurality of original sheets, scan the reference member illuminated by said light source only once for acquiring shading correction data and then restart scanning of the remaining original sheets without scanning said reference member, in a case that the predetermined time has elapsed.

* * * * *